(12) United States Patent
Johs et al.

(10) Patent No.: US 6,636,309 B1
(45) Date of Patent: Oct. 21, 2003

(54) APPLICATION OF SPECTROSCOPIC ELLIPSOMETRY TO IN SITU REAL TIME FABRICATION OF MULTIPLE ALTERNATING HIGH/LOW REFRACTIVE INDEX NARROW BANDPASS OPTICAL FILTERS

(75) Inventors: Blaine D. Johs, Lincoln, NE (US); Jeffrey S. Hale, Lincoln, NE (US)

(73) Assignee: J.A. Woollam Co., Lincoln, NE (US)

( * ) Notice: Subject to any disclaimer, the term of this patent is extended or adjusted under 35 U.S.C. 154(b) by 202 days.

(21) Appl. No.: 09/916,836

(22) Filed: Jul. 27, 2001

(51) Int. Cl.$^7$ .................................................. G01J 4/00

(52) U.S. Cl. ....................................... 356/369; 356/365

(58) Field of Search .................................. 356/369, 365, 356/364, 366, 367, 368; 250/225

(56) References Cited

U.S. PATENT DOCUMENTS

| | | | | |
|---|---|---|---|---|
| 4,906,844 A | * | 3/1990 | Hall | 250/225 |
| 5,091,320 A | * | 2/1992 | Aspnes et al. | 427/8 |
| 5,131,752 A | * | 7/1992 | Yu et al. | 356/369 |
| 5,277,747 A | * | 1/1994 | Aspnes | 438/5 |
| 5,494,697 A | * | 2/1996 | Blayo et al. | 427/10 |
| 5,666,200 A | * | 9/1997 | Drevillon et al. | 356/368 |
| 5,835,221 A | * | 11/1998 | Lee et al. | 356/369 |
| 6,034,777 A | * | 3/2000 | Johs et al. | 356/369 |

* cited by examiner

Primary Examiner—Rodney Fuller
(74) Attorney, Agent, or Firm—James D. Welch

(57) ABSTRACT

Application of selected wavelength range, oblique angle of incidence, reflection mode, spectroscopic ellipsometry DELTA data to monitor and/or control fabrication of multiple layer High/Low Refractive Index Narrow Bandpass Optical Filters, either alone or in combination with transmissive or reflective non-ellipsometric data obtained at an essentially normal angle of incidence.

20 Claims, 6 Drawing Sheets

APPLICATION OF SPECTROSCOPIC ELLIPSOMETRY TO IN SITU REAL TIME FABRICATION OF MULTIPLE ALTERNATING HIGH/LOW REFRACTIVE INDEX NARROW BANDPASS OPTICAL FILTERS

TECHNICAL FIELD

The present invention relates to application of Ellipsometry to in-situ real-time monitoring and/or process control; and more precisely to the monitoring and/or controlling of the fabrication of multiple high/low refractive index layer narrow passband optical filters using oblique angle-of-incidence spectroscopic ellipsometric DELTA determination over a wavelength range, around said narrow passband center wavelength, in which wavelength range reflectivity is essentially 100%. Said method is optionally enhanced by combination with essentially normal angle-of-incidence non-ellipsometric transmission extrema turning point data.

BACKGROUND

The use of Spectroscopic Ellipsometry (SE) to non-invasively characterize properties, (such as thickness, composition, morphology and optical constants), of thin films ex-situ is well known. And, while less common, application to real-time in-situ fabrication monitoring and control is also known, particularly in the semiconductor area. Further, it is known that said techniques are directly applicable to investigating sample systems comprised of multiple thin film layers.

Ellipsometry basically monitors a change in Polarization State of a beam of electromagnetism, which polarization state change occurs as a result of interaction with a sample system. Based upon said change in polarization state, sample system characterizing ellipsometric PSI ($\psi$) and ellipsometric DELTA ($\Delta$), which are defined by:

$$\text{Tan}(4)e^{i\Delta} = \rho = \Gamma_p/\Gamma_s$$

where $r_p$ and $r_s$ can be complex Fresnel reflectivities for "p" and "s" polarized components, can be determined. It is noted that Rho ($\rho$) is a complex number defined as the ratio of the reflectivity of "p-polarized" to reflectivity of the "s-polarized" components of a beam of polarized electromagnetic radiation. In polar form, Tan($\psi$) corresponds to the magnitude of the reflectivity ratio and ($\Delta$) corresponds to the phase angle introduced between "p" and "s" polarized components by interaction with the sample system. Further, it should be understood that said "p" component is defined as being in the plane of an incident and reflected beam of electromagnetic radiation, which plane also contains a normal to the surface of a the reflective surface of the sample system. And the "s" component is defined as being perpendicular to the direction of the "p" component and also parallel to said reflective surface of the sample system.

It should be appreciated that ellipsometry determines a ratio of "p" and "s" polarization component intensity values rather than an absolute intensity value, and that ellipsometry provides phase shift information, (ie. between said "p" and "s" components), which is not available from electromagnetic beam intensity reflection or transmission data, wherein change in "p" and "s" polarization states are not monitored. It is further to be appreciated that said phase shift information is generally very sensitive to properties, (and changes therein), associated with ultra-thin films.

It must also be appreciated that many types of Ellipsometer systems exist, many of which sequentially comprise a source of electromagnetic radiation, a polarizer means for setting a polarization state, a means for supporting a sample system, an analyzer means for selecting a polarization state, and a detector means for receiving electromagnetic radiation and producing a signal which is proportional to its intensity. Typically at least one element in the ellipsometer system is caused to rotate during data acquisition, and said rotating element can be the polarizer means or analyzer means. A problem in applying rotating polarizer or rotating analyzer ellipsometer systems, however, is that ellipsometric DELTA's of 0.0 or 180 degrees are impossible to measure therewith without use of means such as the J.A. Woollam Co. Autoretarder, (see U.S. Pat. Nos. 5,757,494 and 5,956,145). In that light it is disclosed that a relevant benefit exists where the polarizer means and analyzer means are both held essentially stationary during data acquisition, and instead an additional element, (ie. a compensator), is present and rotated during said data acquisition. The reason for this is that an important benefit is associated with rotating compensator ellipsometers in that ellipsometric DELTA's are measurable thereby over the entire range of 0.0–360 degrees. In addition, although not as important to the present invention, rotating compensator ellipsometer systems can still measure ellipsometric PSI's the entire range of 0.0 to 90 degrees. The J.A. Woollam Co. "M2000" (Reg. Trademark), Rotating Compensator Ellipsometer System is described in U.S. Pat. No. 5,872,630.

Continuing, of growing importance is the fabrication and application of Narrow Bandpass Optical Filters. Said Narrow Bandpass Optical Filters, which provide very sharp cutoff characteristics, (eg. said passbands providing a bandwidth of a nanometer or so with combined high and low transition to cutoff being less than a nm), are typically comprised of up to a hundred or more layers of alternating quarter-wavelength thick high, and quarter wavelength thick low, refractive index materials, said sequence being beneficially interspersed with half-wavelength thick cavities and/or coupling layers. Present manufacturing techniques typically control deposition of the layers of alternating quarter-wavelength high, and quarter wavelength low, optically thick refractive index materials utilizing transmission data, wherein a cyclic pattern of Transmission vs. Layer Number "extrema" turning points are used to determine when to change from depositing low to high, and vice-verse, refractive index material. A problem with this approach is that in some ranges said Transmission data can be relatively insensitive to change in thickness of deposited material.

In view of known prior art, there remains need for improved methodology for monitoring and/or controlling fabrication of multiple layer Narrow Bandpass Optical Filters.

DISCLOSURE OF THE INVENTION

The present invention is based in the discovery that, over a limited range of wavelengths surrounding the central passband wavelength of a Narrow Bandpass Optical Filter, ellipsometric DELTA's which are determined using data obtained by oblique angle spectroscopic ellipsometric investigation, are very well behaved and that high and low refractive index materials demonstrate easily differentiated ellipsometric DELTA vs. Wavelength plots. Further, ellipsometric DELTA's are related to optical thickness of the surface layer of a Narrow Bandpass Optical Filter during fabrication, with minimal influence on said DELTA's being effected by previously deposited layers.

It is noted that presently Transmission Intensity Extrema Turning Point vs. Layer Number data is typically utilized during fabrication of Narrow Bandpass Optical Filters, to provide generally good insight as to when to change from deposition of high to low, and low to high refractive index materials, when quarter-wavelength optically thick layers are being formed. However, where other than quarter-wavelength optical thickness layers are being formed said transmission extrema turning point data is not sufficient to provide reliable data upon which can be based said decision. It is in that light that the present invention teaches supplementing said conventional Transmission Intensity Extrema Turning Point vs. Layer Number data with ellipsometric DELTA vs. wavelength data to improve fabrication precision.

The present invention methodology can however, be applied alone, (ie. not in combination with conventional Transmission Intensity Extrema Turning Point vs. Layer Number data). The present invention then teaches use of ellipsometric DELTA vs. wavelength data alone to monitor and/or control deposition of quarter-wavelength, and non-quarter wavelength, optical thickness layers. This is enabled as said ellipsometric DELTA data provides insight to the optical thickess of a layer of material, be it a high or low refractive index material, being deposited, said layer of material being immediately at the surface regardless of the stage of fabrication. That is, the ellipsometric DELTA data minimally sensitive to previously deposited layers.

A present invention method of monitoring and/or controlling fabrication of Narrow Bandpass Optical Filters which transmit a central passband of wavelengths while rejecting wavelengths outside thereof, then comprises the steps of;

a. providing a system for fabricating Narrow Bandpass Optical Filters which comprises means for depositing alternating layers of High and Low refractive Index materials onto a substrate; and b. providing a spectroscopic ellipsometer system;

c. applying said spectroscopic ellipsometer system to said system for fabricating Narrow Bandpass optical Filters such that a substrate can be monitored in a reflective mode, by a beam of polarized spectroscopic electromagnetic radiation provided by said spectroscopic ellipsometer system, said spectroscopic ellipsometer system being oriented so as to direct a beam of polarized spectroscopic electromagnetic radiation upon said substrate surface at an oblique angle;

d. placing a substrate into said system for fabricating Narrow Bandpass Optical Filters;

e. while depositing a plurality of alternating High and Low Refractive Index layers onto said substrate, in real-time determining the Ellipsometric DELTA;

f. utilizing the resulting Ellipsometric DELTA data to monitor and/or control the fabrication process.

Said method can further comprise, in combination with step b, the steps of:

b'. providing an essentially monochromatic central passband wavelength source of electromagnetic radiation, and a detector thereof, and c'. orienting said essentially central passband monochromatic wavelength source of electromagnetic radiation and detector thereof such that a beam of electromagnetic radiation is provided by said essentially monochromatic central passband wavelength source of electromagnetic radiation substantially along a normal to the surface of the substrate, transmits through said substrate and enters said detector.

When said steps b'. and c'. are added the method then further comprises obtaining real-time electromagnetic radiation Transmission data, and utilizing the results thereof in combination with the spectroscopic ellipsometric data in practicing step f. This can involve, for instance, using the transmission data to determine a sequence of extrema turning points in a plot of transmission intensity vs. layer number, and using said extrema turning points to determine when to change from depositing high to low and low to high refractive index materials when depositing quarter-wavelength optical thickness layers. The Ellipsometric DELTA data, which typically comprises a sequence of DELTA values vs. wavelength, is used to determine when to change from depositing high to low and low to high refractive index materials when depositing other than quarter-wavelength optical thickness layers, and to supplement the transmission data where said data indicates low sensitivity to quarter-wave optical thickness layer fabrication results.

A preferred embodiment of the recited method of monitoring and/or controlling fabrication of Narrow Bandpass Optical Filters further comprises a step of determining a wavelength range, around the central bandpass wavelengths, in which reflectivity of the Narrow Bandpass Optical Filter being fabricated is expected to be essentially 100%, and during the step e. determination of Ellipsometric DELTA, limiting determination of the ellipsometric DELTA using only that range of wavelengths. Said preferred embodiment can also include excluding the central passband wavelengths during said ellipsometric DELTA determination.

A more detailed recitation of the present invention methodology for monitoring and/or controlling fabrication of Narrow Bandpass Optical Filters which transmit a central passband of wavelengths while rejecting wavelengths outside thereof, to comprises the steps of;

a. providing a system for fabricating Narrow Bandpass Optical Filters which comprises means for depositing alternating layers of High and Low refractive Index materials onto a substrate; and b. providing a spectroscopic ellipsometer system and an essentially monochromatic transmission system;

c. applying said spectroscopic ellipsometer system to said system for fabricating Narrow Bandpass Optical Filters such that a substrate can be monitored in a reflective mode, by a beam of polarized spectroscopic electromagnetic radiation provided by said spectroscopic ellipsometer system, said spectroscopic ellipsometer system being oriented so as to direct a beam of polarized spectroscopic electromagnetic radiation onto said substrate surface at an oblique angle;

c'. applying said essentially monochromatic transmission system to said system for fabricating Narrow Bandpass Optical Filters such that a substrate can be monitored in a transmissive mode by a beam of electromagnetic radiation which is provided by said essentially monochromatic central passband wavelength source of electromagnetic radiation, said essentially monochromatic transmission monitoring system being oriented to direct a beam of essentially monochromatic radiation substantially along a normal to the surface of the substrate;

d. placing a substrate into said system for fabricating Narrow Bandpass Optical Filters;

e. determining a wavelength range around a central band pass wavelength of the Narrow Bandpass Optical Filter in which reflectivity thereof to a beam of electromagnetic radiation impinged at an oblique angle to a surface thereof is expected to to be essentially 100%;

f. while depositing a plurality of alternating High and Low Refractive Index layers onto said substrate, determining both transmission data in the central passband wavelengths, and Ellipsometric DELTA in the range of wavelengths identified in step e., said determined transmission data comprising a sequence of extrema turning points in a plot of transmission intensity vs. layer number, and said determined ellipsometric DELTA data comprising a sequence of DELTA values vs. wavelength;

g. utilizing the resulting Transmission and Ellipsometric DELTA data to monitor and/or control the fabrication process, said extrema turning points being used to determine when to change from depositing high to low and low to high refractive index materials when depositing quarter-wavelength optical thickness layers, and said ellipsometric DELTA data being used to determine when to change from depositing high to low and low to high refractive index materials when depositing other than quarter-wavelength optical thickness layers;

Again, said method of monitoring and controlling fabrication of Narrow Bandpass Optical Filters can include excluding the central passband wavelengths from the range of wavelengths over which the ellipsometric DELTA is determined as identified in step e., and utilized in step f.

It is disclosed that, while not limiting, a preferred spectroscopic ellipsometer system for application in practicing the present invention is a rotating compensator sample system investigation system comprising a source of a polychromatic beam of electromagnetic radiation, a polarizer, a stage for supporting a sample system, an analyzer, a dispersive optics and at least one detector system which contains a multiplicity of detector elements. In addition, said spectroscopic rotating compensator sample system investigation system further comprises at least one compensator(s) positioned at a location selected from the group consisting of: (before said stage for supporting a sample system, and after said stage for supporting a sample system, and both before and after said stage for supporting a sample system). When said spectroscopic rotating compensator sample system investigation system is used to investigate a sample system present on said stage for supporting a sample system, said analyzer and polarizer are maintained essentially fixed in position and at least one of said at least one compensator(s) is caused to continuously rotate while a polychromatic beam of electromagnetic radiation produced by said source of a polychromatic beam of electromagnetic radiation is caused to pass through said polarizer and said compensator(s), said polychromatic beam of electromagnetic radiation being also caused to interact with said sample system, pass through said analyzer and interact with said dispersive optics such that a multiplicity of essentially single wavelengths are caused to simultaneously enter a corresponding multiplicity of detector elements in said at least one detector system. The described rotating compensator ellipsometer system is sold by the J.A. Woollam CO. under the Trademark M2000, and is protected by U.S. Pat. No. 5,872,630.

The present invention will be better understood by reference to the Detailed Description Section of this Specification, in combination with the Drawings.

SUMMARY OF THE INVENTION

It is therefore a primary purpose and/or objective of the present invention to teach a method which is useful in the fabrication of multiple layer high/low refractive index, narrow bandpass optical filter structures, which method utilizes spectroscopic ellipsometry.

In conjunction with the first purpose and/or objective, it is further a purpose and/or objective of the present invention to teach:

use of ellipsometric DELTA vs. Wavelength data determined at an oblique angle of incidence over a wavelength range around a central passband wavelength of a narrow bandpass optical filter, in which wavelength range the reflectivity is essentially 100%, in monitoring and/or controlling the fabrication of multiple layer high/low refractive index, narrow bandpass optical filter structures.

It is a further purpose and/or objective of the present invention to teach combined use of:

ellipsometric DELTA vs. Wavelength data determined at an oblique angle of incidence over a wavelength range around a central passband wavelength of a narrow bandpass optical filter, in which wavelength range the reflectivity is essentially 100%, from which wavelength range the central passband wavelengths are optionally excluded, and transmission extrema turning point data achieved at said central passband wavelength;

in monitoring and/or controlling the fabrication of multiple layer, high/low refractive index, narrow bandpass optical filter structures.

Other objectives and/or purposes will become apparent from a reading of the Specification and Claims.

DETAILED DESCRIPTION

Figure 1:
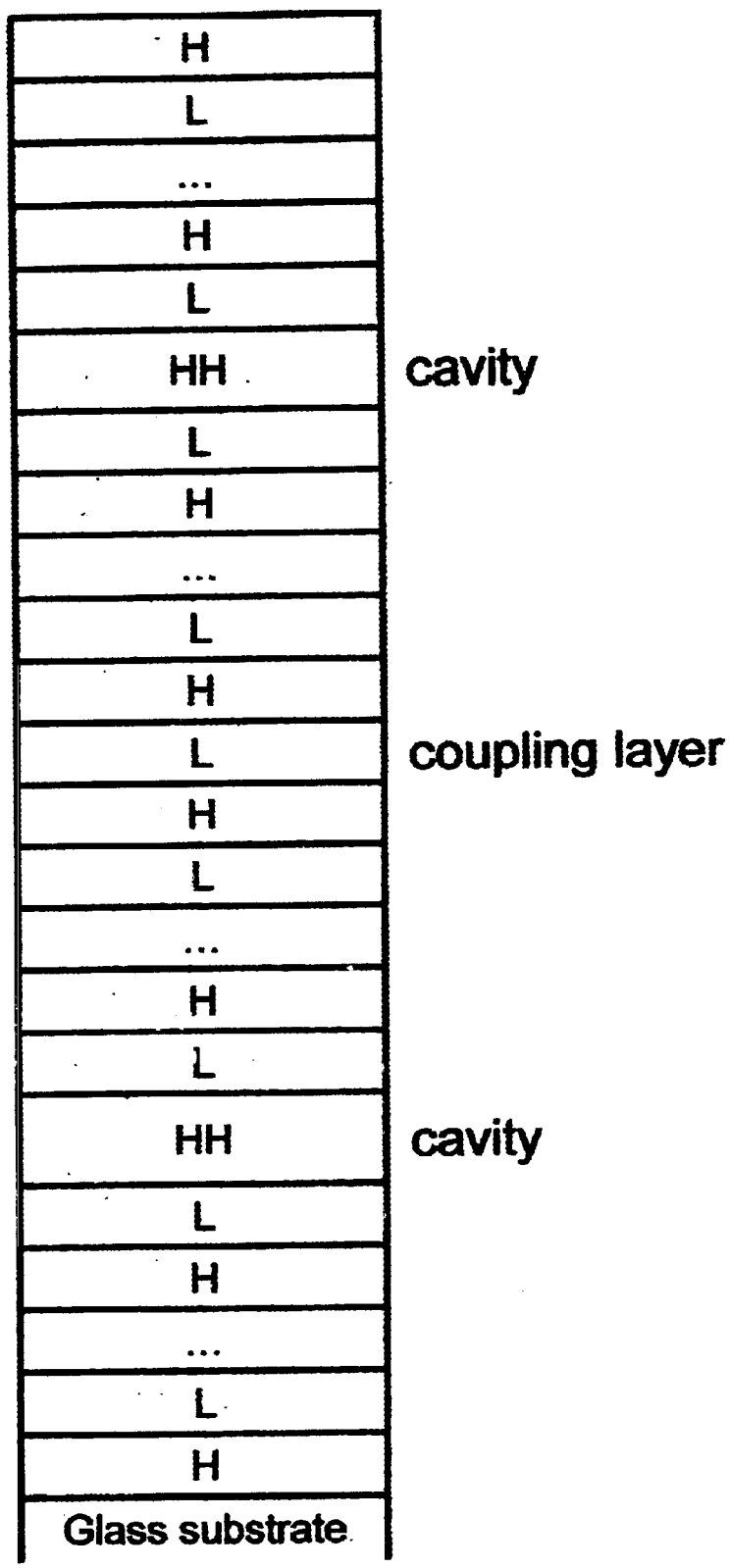
FIG. 1, shows a schematic of a 2-cavity all dielectric narrow bandpass optical filter structure.

Turning now to FIG. 1, it should be appreciated that a schematic of a 2-cavity all dielectric narrow bandpass optical filter structure is shown.

Figure 3:
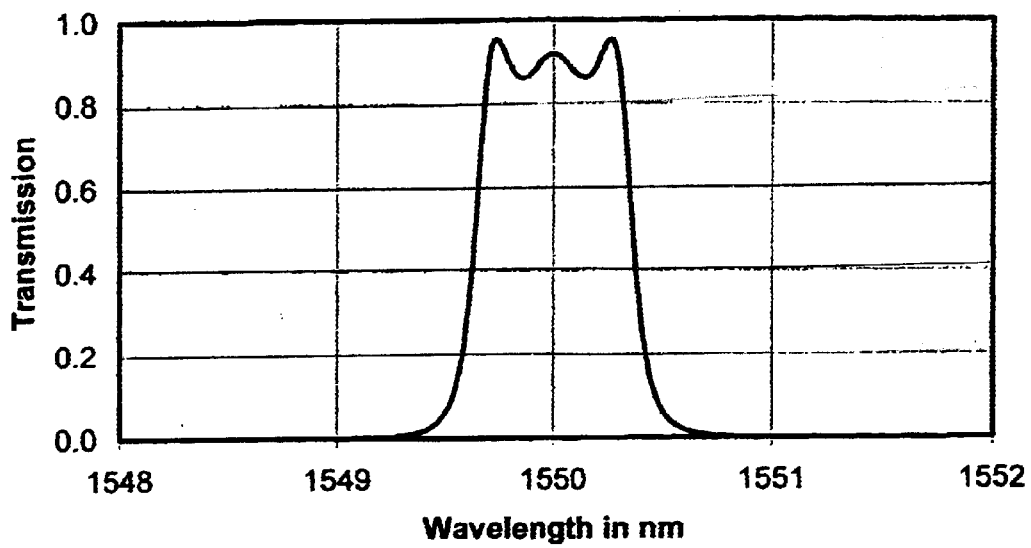
FIG. 3 shows a typical Transmission characteristic for a 3-cavity narrow bandpass optical filter over a wavelength range of 1548 to 1552 nm.
Figure 2:
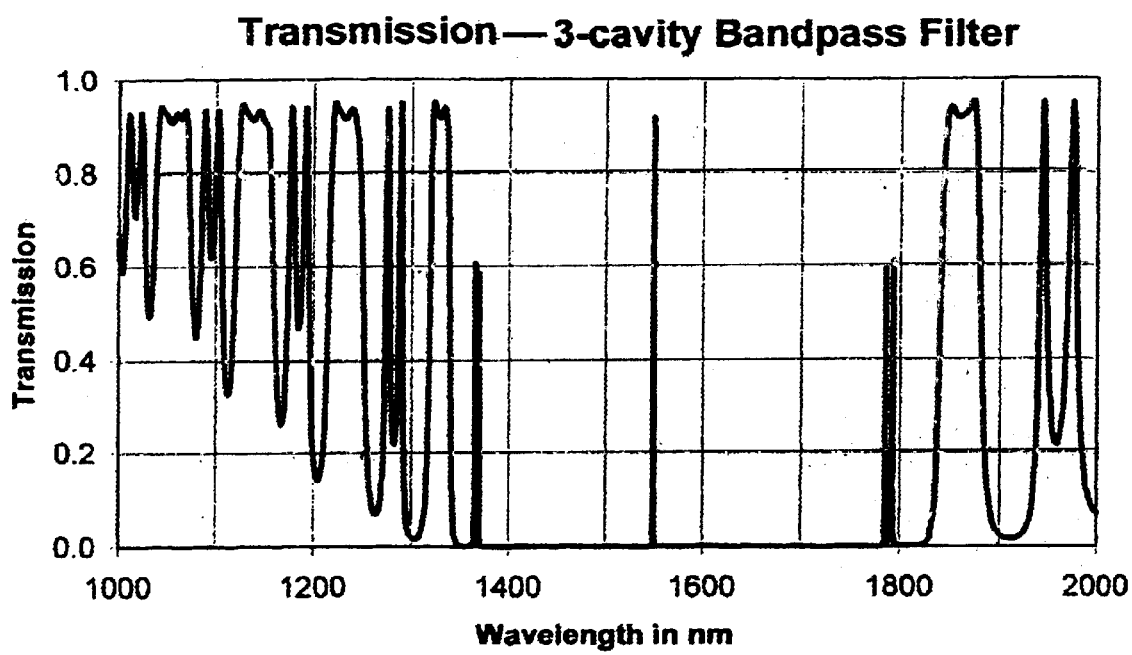
FIG. 2 shows the Transmission characteristic for the 3-cavity narrow bandpass optical filter shown in FIG. 2, over a range of 1000 to 2000 nm.

FIG. 2 shows the Transmission characteristic for the 3-cavity narrow bandpass optical filter shown in FIG. 2, over a range of 1000 to 2000 nm. FIG. 3 shows a typical Transmission characteristic for a 3-cavity narrow bandpass optical filter over a wavelength range of 1548 to 1552 nm.

Figure 4:
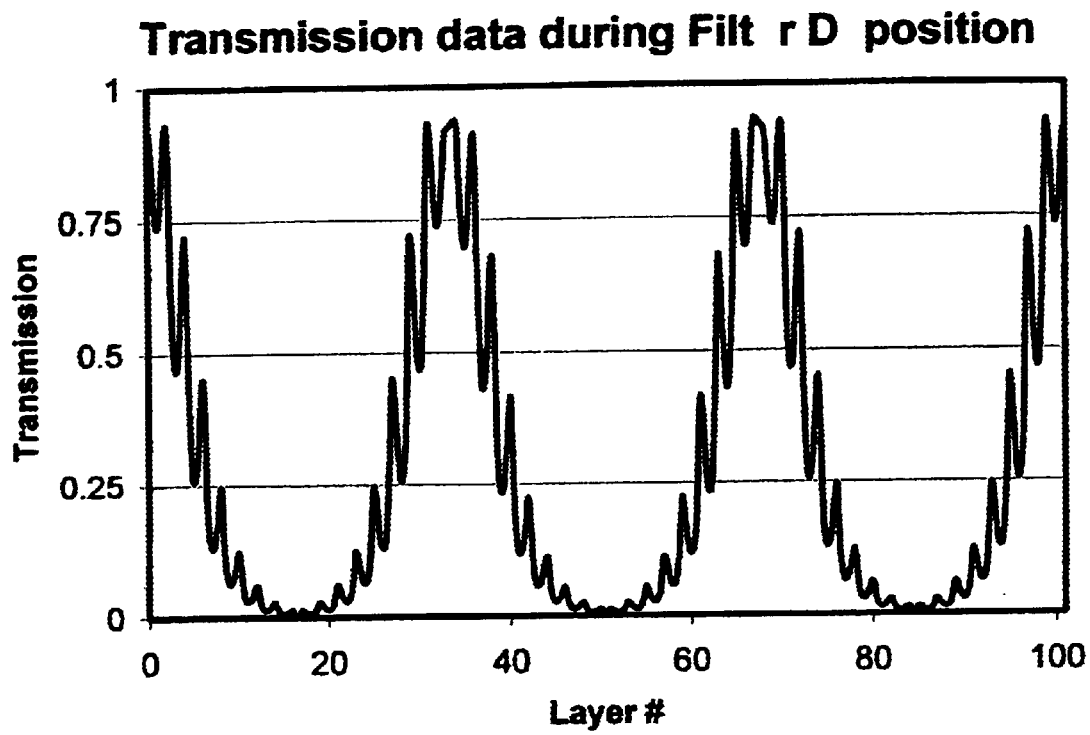
FIG. 4 demonstrates a typical "extrema" featuring plot of electromagnetic beam intensity Transmission vs. Number of Layers, (eg. between 0 and 100).
Figure 5:
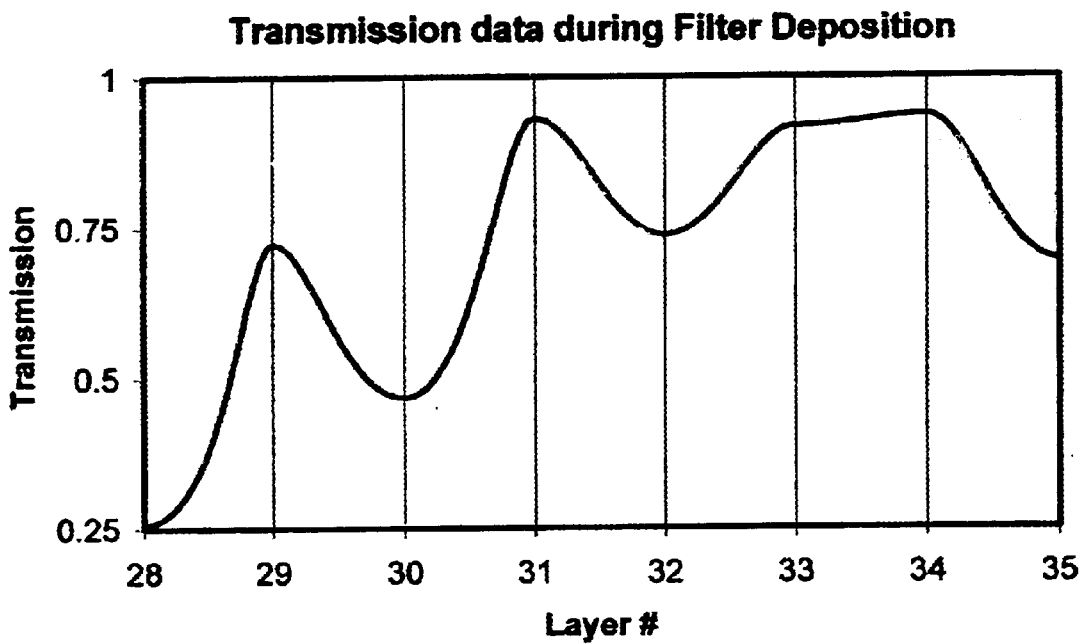
FIG. 5 show a region of FIG. 4 in which the region involving Layers 28 to 35 is expanded.

FIG. 4 demonstrates a typical "extrema" featuring plot of electromagnetic beam intensity Transmission vs. Number of Layers, (eg. between 0 and 100), and FIG. 5 show a region of FIG. 4 in which the region involving Layers 28 to 35 is expanded. The important thing to note is that the Transmission plot in FIG. 5 shows low sensitivity at layers 33 to 34. The point demonstrated is that use of Transmission data as shown, enables less than optimum monitoring and/or control during fabrication of some layers of a multi-layer narrow bandpass optical filter. This is an on-going fabrication control problem faced by industry.

Figure 6:
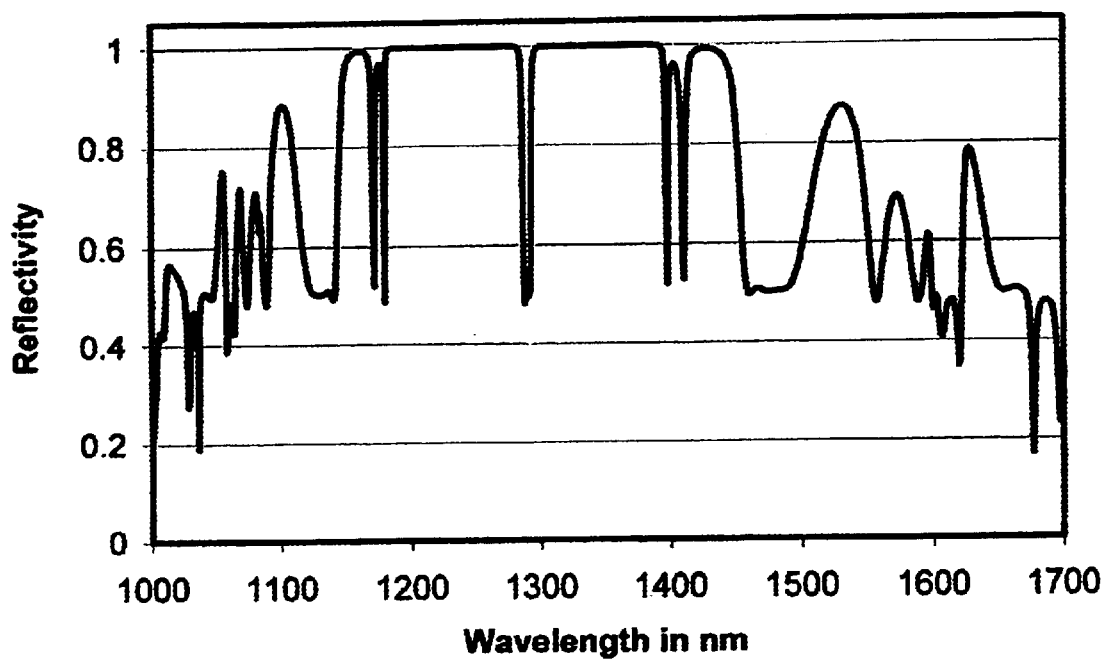
FIG. 6 shows a Reflectivity plot over a range of wavelengths from 1000 to 1700 nm.
Figure 7:
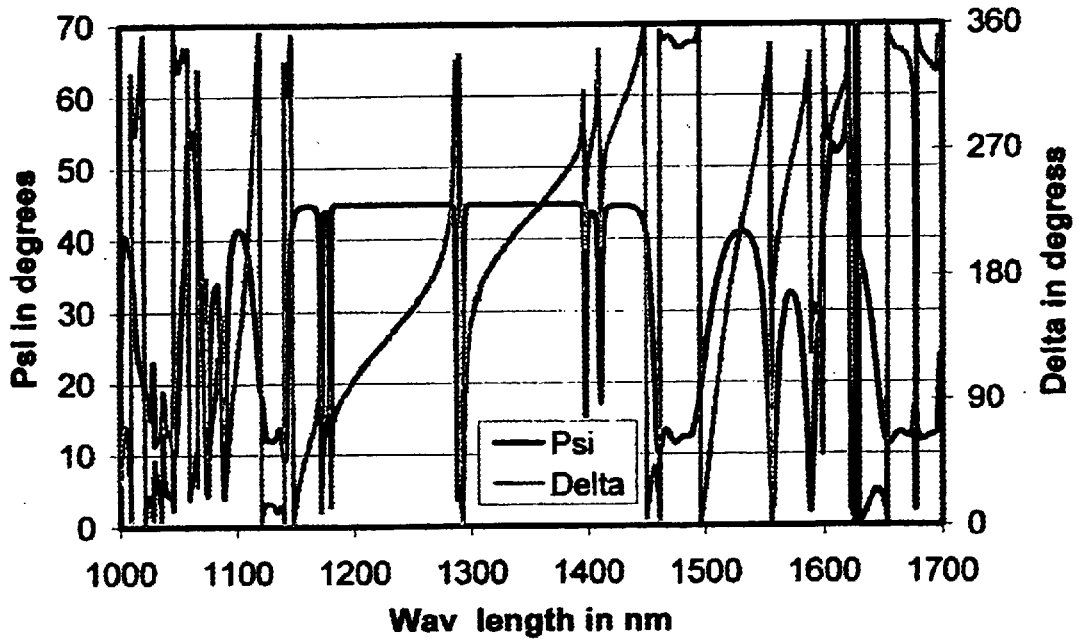
FIG. 7 shows ellipsometric PSI and DELTA determine cover the same wavelength range as represented in FIG. 6.
Figure 8:
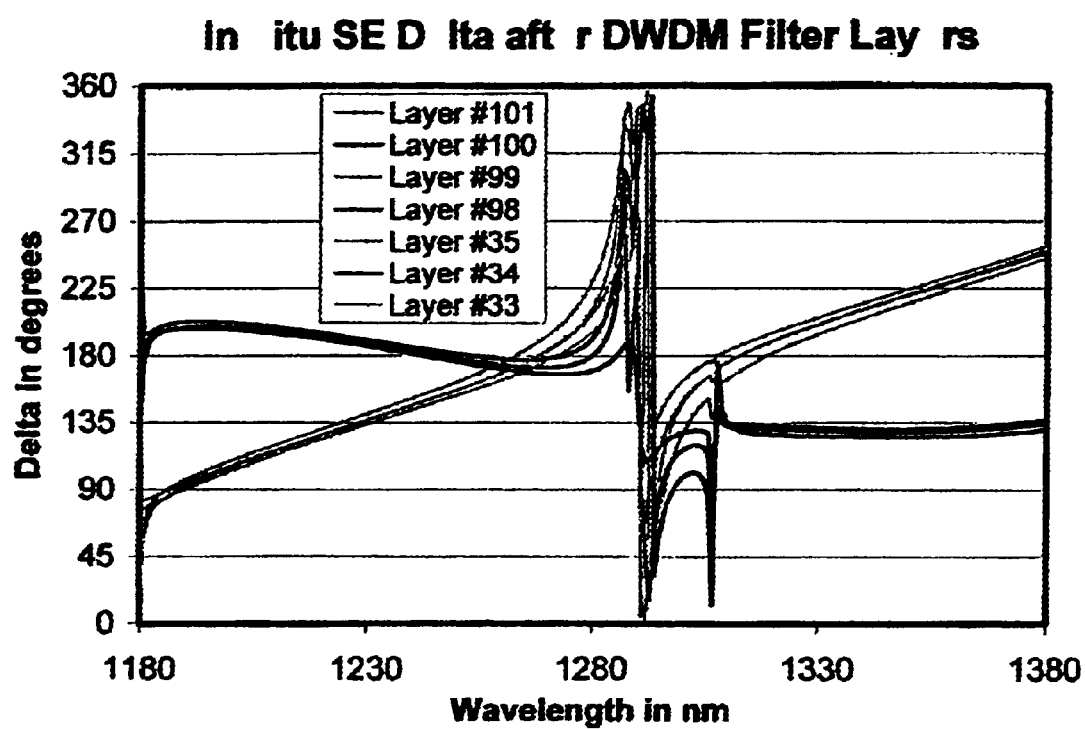
FIG. 8 shows ellipsometric DELTA over the range of wavelengths 1180 to 1380, which wavelength range corresponds to the range of essentially 100% reflectivity identified in FIG. 6.

Turning now to FIGS. 6, 7 and 8, there is shown data obtained from a narrow passband optical filter, which passband is centered around 1280 nm when electromagnetic radiation is impinged thereupon at an oblique angle of seventy (70) degrees from a normal to the narrow bandpass optical filter surface.

Note that a narrow passband optical filter with a passband at 1550 nm, (as shown in FIGS. 3 and 4), determined using an electromagnetic beam entered along a normal to the surface of the narrow passband optical filter, is typically shifted to a passband centered at other than 1550 nm, (eg. 1280 nm), such indicated in FIGS. 6, 7 and 8, when a beam of electromagnetic radiation is entered at an oblique angle, (eg. 70 degrees) from a normal to said surface.

FIG. 6 shows a Reflectivity plot over a range of wavelengths from 1000 to 1700 nm. FIG. 7 shows ellipsometric PSI and DELTA determine cover the same wavelength range as represented in FIG. 6. FIG. 8 shows ellipsometric DELTA over the range of wavelengths 1180 to 1380, which wavelength range corresponds to the range of essentially 100% reflectivity identified in FIG. 6. Note that two very distinct and easily differentiated groupings of DELTA values are present, over the range of wavelengths shown in FIG. 8. One of said DELTA groupings corresponds to high refractive index material, and the other thereof corresponds to low refractive index material. In that the ellipsometric DELTA is related to a thin film optical thickness, (ie. the refractive index multiplied by the physical thickness), the benefit of the present approach to monitoring quarter wavelength layers in High/Low narrow bandwidth optical filters can be appreciated. And, as mentioned, said ellipsometric DELTA data being determined in a wavelength range where reflectivity is essentially 100%, provides information relevant to the surface layer, and said data is not significantly affected by previously deposited layers.

The present invention method then focuses on determination of ellipsometric DELTA over a determined range of wavelengths which is centered around a central passband wavelength in a multiple layer High/Low stack narrow passband optical filter, over which determined range of wavelengths the oblique angle of incidence reflectivity of the multiple layer High/Low stack narrow passband optical filter, is essentially 100%. The preferred embodiment of the present invention method does not utilize wavelengths outside said determined range of wavelengths when determining ellipsometric DELTA, and optionally also deletes passband wavelengths. Determination of the appropriate range of wavelengths can be performed in a completely separate Reflectivity monitoring step, or can be determined from collected ellipsometric data essentially simultaneous with use thereof in determining ellipsometric DELTA by, for instance, a mathematical regression of acquired data onto a proposed mathematical model.

It is noted also that ellipsometric PSI is typically more dependent on non-idealities, such as surface roughness and refractive index grading in a thin layer, than it is to optical thickness. Hence, the preferred approach under present invention teachings, is to discard the ellipsometric PSI data.

A variation of the present invention method combines:
conventional determination of transmission turning points, (see FIG. 4 demonstration thereof), via use of normal incidence electromagnetic radiation set at the passband wavelength, and
determination of ellipsometric DELTA over a range of wavelengths around said passband wavelength wherein reflectivity is essentially 100%, via use of spectroscopic oblique incidence electromagnetic radiation around the narrow passband wavelength.

Said combined approach enables better control, via use of ellipsometric DELTA data obtained at oblique angle, over non-quarter wavelength thick cavity growth, and said ellipsometric DELTA data can supplement transmission turning point data in regions wherein sensitivity is low, (eg. see low slope Transmission plot in FIG. 5 at layers 33 to 34).

Figure 9:
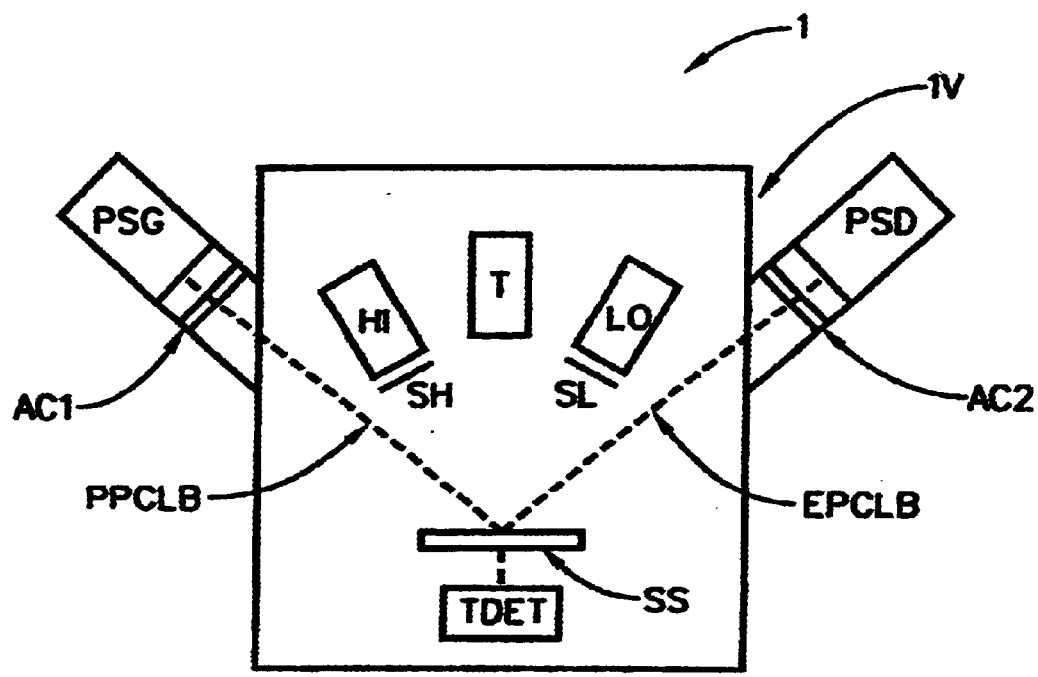
FIG. 9 demonstrates a deposition system generally representative of that in which narrow bandpass optical filter structures can be fabricated.
Figure 10:
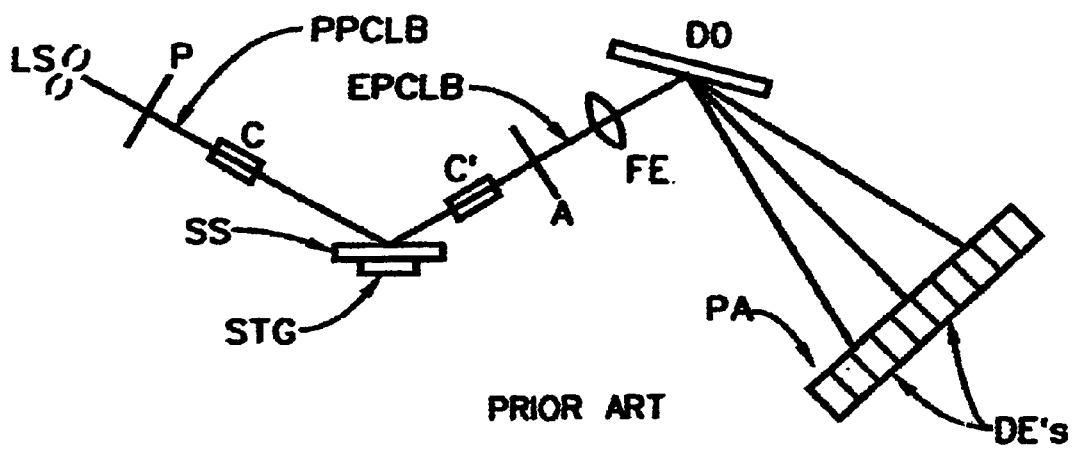
FIG. 10 demonstrates a Rotating Compensator Ellipsometer System, as Claimed in U.S. Pat. No. 5,872,630.

To provide general insight to systems for practicing the present invention, FIGS. 9 and 10 are included. FIG. 9 demonstrates a deposition system (1) comprising a Vacuum Chamber (IV), (which during use is held at low internal pressure, eg. $10^{-9}$ Tor), to Vacuum Chamber (1V) is affixed Polarization Stage Generator (PSG) and Polarization State Detector (PSD) Systems. The Polarization State Generator (PSG) provides an electromagnetic beam, (oblique angled dashed line (PPCLB)), which reflects from the surface of a Sample System (SS) and enters the Polarization State Detector (PSD), (oblique angled dashed line (EPCLB)). The (PSG) and (PSD) are external to the Vacuum Chamber (IV) in ambient atmosphere, and that Windows (AC1) and (AC2) provide pressure difference interfacing. (Note that U.S. Pat. No. 6,034,777 describes how to compensate for the effects of said Windows when determining ellipsometric DELTA's, and that said 777 Patent is incorporated herein by reference). Also shown is a Transmission Source (T) of a beam of electromagnetic radiation, (vertical dashed line), and a Transmission Detector (TDET) for use in Transmission investigation of the Sample System (SS). Also shown are means for depositing high (HI) and low (LO) refractive index materials, with shutters (SH) and (SL), respectively providing controlled access of materials provided therefrom to the Sample System (SS). The Transmission Source (T) and Detector (TDET) are shown present in the Vacuum Chamber (IV), but it is to be understood that they can be external thereto, similar to the Ellipsometer components (PSG) and (PSD), just as could, the spectroscopic ellipsometer (PSG) and (PSD) be located within the Vacuum Chamber (1V). Any functional location and orientation of the ellipsometer and transmission system elements is within the scope of the present invention.

FIG. 10 demonstrates a Rotating Compensator Ellipsometer System, as Claimed in U.S. Pat. No. 5,872,630, (note, said 630 Patent also teaches regression calibration of the Rotating Compensator Ellipsometer and said 630 Patent is incorporated herein by reference), which Rotating Compensator Ellipsometer System is configured in a reflection mode and comprises a source (LS) of a polychromatic beam of electromagnetic radiation (PPCLB), a polarizer (P), a stage (STG) for supporting a sample system, an analyzer (A), a dispersive optics (DO) and at least one detector system (DET) which contains a multiplicity of detector elements (DE's). Said spectroscopic rotating compensator sample system investigation system further comprising at least one compensator(s) (C) (C') (C") positioned at a location selected from the group consisting of: (before said stage (STG) for supporting a sample system (SS), and after said stage (STG) for supporting a sample system (SS), and both before and after said stage (STG) for supporting a sample system (SS)). When said spectroscopic rotating compensator sample system investigation system is used to investigate a sample system (SS) present on said stage (STG) for supporting a sample system, said analyzer (A) and polarizer (P) are maintained essentially fixed in position and at least one of said at least one compensator(s) (C) (C') (C") is caused to continuously rotate while a polychromatic beam of electromagnetic radiation (PPCLB) produced by said source (LS) of a polychromatic beam of electromagnetic radiation (PPCLB) is caused to pass through said polarizer (P) and said compensator(s) (C) (C') (C"), and said polychromatic beam of electromagnetic radiation is also caused to interact with said sample system (SS), pass through said analyzer (A) and interact with said dispersive optics (DO) such that a multiplicity of essentially single wavelengths are caused to simultaneously enter a corresponding multiplicity of detector elements (DE's) in said at least one detector system (DET). Note that an optional Focusing Lens (FE) is also indicated as optionally present, and when present serves to provide a better defined spot of electromagnetic radiation to the Dispersive Optics (DO).

To coordinate FIGS. 9 and 10, it is noted that the FIG. 9 Polarization State Generator (PSG) can be considered to be a combination of the FIG. 10 Source of Electromagnetic Radiation (LS), Polarizer (P), and perhaps Compensator (C), while the FIG. 9 Polarization State Detector (PSD) can be considered to be comprised of a combination of FIG. 10 Analyzer (A), Dispersive Optics (DO), and Detector (PA), in optional combination with the Focusing Lens (FE) and Compensator (C').

In the foregoing, the terminology "optical thickness" should be understood to refer to the product of the refractive index and physical thickness, (n×t), of a layer of material.

While not limiting, it is noted that high and low refractive index materials from which a multiple layer, narrow passband optical filter can be constructed, are $Ta_2O_5$ and $SiO_2$, respectively.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

What is claimed is:

1. A method of monitoring and/or controlling fabrication of Narrow Bandpass Optical Filters which transmit a central passband of wavelengths while rejecting wavelengths outside thereof, comprising the steps of;
    a. providing a system for fabricating Narrow Bandpass Optical Filters which comprises means for depositing alternating layers of High and Low refractive Index materials onto a substrate; and
    b. providing a spectroscopic ellipsometer system;
    c. applying said spectroscopic ellipsometer system to said system for fabricating Narrow Bandpass Optical Filters such that a substrate can be monitored in a reflective mode, by a beam of polarized spectroscopic electromagnetic radiation provided by said spectroscopic ellipsometer system, said spectroscopic ellipsometer system being oriented so as to direct a beam of polarized spectroscopic electromagnetic radiation upon said substrate surface at an oblique angle;
    d. placing a substrate into said system for fabricating Narrow Bandpass Optical Filters;
    e. while depositing a plurality of alternating High and Low Refractive Index layers onto said substrate, in real-time determining the Ellipsometric DELTA;
    f. utilizing the resulting Ellipsometric DELTA data to monitor and/or control the fabrication process.

2. A method of monitoring and/or controlling fabrication of Narrow Bandpass Optical Filters as in claim 1, which further comprises providing an essentially monochromatic central passband wavelength source of electromagnetic radiation, and a detector thereof, and orienting said essentially central passband monochromatic source and detector thereof such that a beam of electromagnetic radiation is provided by said essentially monochromatic central passband wavelength source of electromagnetic radiation substantially along a normal to the surface of the substrate, transmits through said substrate and enters said detector, and obtaining real-time electromagnetic radiation Transmission data, and utilizing the results thereof in combination with the spectroscopic ellipsometric data in practicing step f.

3. A method of monitoring and/or controlling fabrication of Narrow Bandpass Optical Filters as in claim 1, which further comprises an initial step of determining a wavelength range, around the central bandpass wavelengths, in which reflectivity of the Narrow Bandpass Optical Filter being fabricated is expected to be essentially 100%, and during the step e. determination of Ellipsometric DELTA, limiting determination of the ellipsometric DELTA using only that range of wavelengths.

4. A method of monitoring and/or controlling fabrication of Narrow Bandpass Optical Filters as in claim 3, which includes excluding the central passband wavelengths.

5. A method of monitoring and/or controlling fabrication of Narrow Bandpass Optical Filters as in claim 1, in which the spectroscopic ellipsometer system comprises:
    a spectroscopic rotating compensator sample system (SS) investigation system comprising a source (LS) of a polychromatic beam of electromagnetic radiation (PPCLB), a polarizer (P), a stage (STG) for supporting a sample system, an analyzer (A), a dispersive optics (DO) and at least one detector system (DET) which contains a multiplicity of detector elements (DE's), said spectroscopic rotating compensator sample system investigation system further comprising at least one compensator(s) (C) (C') (C") positioned at a location selected from the group consisting of: (before said stage (STG) for supporting a sample system (SS), and after said stage (STG) for supporting a sample system (SS), and both before and after said stage (STG) for supporting a sample system (SS)); such that when said spectroscopic rotating compensator sample system investigation system is used to investigate a sample system (SS) present on said stage (STG) for supporting a sample system, said analyzer (A) and polarizer (P) are maintained essentially fixed in position and at least one of said at least one compensator(s) (C) (C') (C") is caused to continuously rotate while a polychromatic beam of electromagnetic radiation (PPCLB) produced by said source (LS) of a polychromatic beam of electromagnetic radiation (PPCLB) is caused to pass through said polarizer (P) and said compensator(s) (C) (C') (C"), said polychromatic beam of electromagnetic radiation being also caused to interact with said sample system (SS), pass through said analyzer (A) and interact with said dispersive optics (DO) such that a multiplicity of essentially single wavelengths are caused to simultaneously enter a corresponding multiplicity of detector elements (DE's) in said at least one detector system (DET).

6. A method of monitoring and/or controlling fabrication of Narrow Bandpass Optical Filters which transmit a central passband of wavelengths while rejecting wavelengths outside thereof, comprising the steps of;
   a. providing a system for fabricating Narrow Bandpass Optical Filters which comprises means for depositing alternating layers of High and Low refractive Index materials onto a substrate; and
   b. providing a spectroscopic ellipsometer system which comprises:
      a spectroscopic rotating compensator sample system investigation system comprising a source (LS) of a polychromatic beam of electromagnetic radiation (PPCLB), a polarizer (P), a stage (STG) for supporting a sample system, an analyzer (A), a dispersive optics (DO) and at least one detector system (DET) which contains a multiplicity of detector elements (DE's), said spectroscopic rotating compensator sample system investigation system further comprising at least one compensator(s) (C) (C') (C") positioned at a location selected from the group consisting of: (before said stage (STG) for supporting a sample system (SS), and after said stage (STG) for supporting a sample system (SS), and both before and after said stage (STG) for supporting a sample system (SS)); such that when said spectroscopic rotating compensator sample system investigation system is used to investigate a sample system (SS) present on said stage (STG) for supporting a sample system, said analyzer (A) and polarizer (P) are maintained essentially fixed in position and at least one of said at least one compensator(s) (C) (C') (C") is caused to continuously rotate while a polychromatic beam of electromagnetic radiation (PPCLB) produced by said source (LS) of a polychromatic beam of electromagnetic radiation (PPCLB) is caused to pass through said polarizer (P) and said compensator(s) (C) (C') (C"), said polychromatic beam of electromagnetic radiation being also caused to interact with said sample system (SS), pass through said analyzer (A) and interact with said dispersive optics (DO) such that a multiplicity of essentially single wavelengths are caused to simultaneously enter a corresponding multiplicity of detector elements (DE's) in said at least one detector system (DET)
   c. applying said spectroscopic ellipsometer system to said system for fabricating Narrow Bandpass Optical Filters such that a substrate can be monitored in a reflective mode, by a beam of polarized spectroscopic electromagnetic radiation provided by said spectroscopic ellipsometer system, said spectroscopic ellipsometer system being oriented so as to direct a beam of polarized spectroscopic electromagnetic radiation upon said substrate surface at an oblique angle;
   d. placing a substrate into said system for fabricating Narrow Bandpass Optical Filters;
   e. determining a wavelength range around a central band pass wavelength of the Narrow Bandpass Optical Filter in which reflectivity thereof to a beam of electromagnetic radiation impinged at an oblique angle to a surface thereof is expected to be essentially 100%;
   f. while depositing a plurality of alternating High and Low Refractive Index layers onto said substrate, determining the Ellipsometric DELTA in the range of wavelengths identified in, step e.;
   g. utilizing the resulting Ellipsometric DELTA data to monitor and/or control the fabrication process.

7. A method of monitoring and/or controlling fabrication of Narrow Bandpass Optical Filters as in claim 6, in which the step f. determining of the Ellipsometric DELTA in the range of wavelengths identified in step e. includes excluding the central passband wavelengths.

8. A method of monitoring and/or controlling fabrication of Narrow Bandpass Optical Filters as in claim 6, which further comprises providing an essentially monochromatic central passband wavelength source of electromagnetic radiation, and a detector thereof, and orienting said essentially-central passband monochromatic source and detector thereof such that a beam of electromagnetic radiation is provided by essentially monochromatic central passband wavelength source of electromagnetic radiation substantially along a normal to the surface of the substrate, transmits through said substrate and enters said detector, and obtaining real-time electromagnetic radiation Transmission data, and utilizing the results thereof in combination with the spectroscopic ellipsometric data.

9. A method of monitoring and/or controlling fabrication of Narrow Bandpass Optical Filters which transmit a central passband of wavelengths while rejecting wavelengths outside thereof, comprising the steps of;
   a. providing a system for fabricating Narrow Bandpass Optical Filters which comprises means for depositing alternating layers of High and Low refractive Index materials onto a substrate; and
   b. providing a spectroscopic ellipsometer system and an essentially monochromatic transmission monitoring system;
   c. applying said spectroscopic ellipsometer system to said system for fabricating Narrow Bandpass Optical Filters such that a substrate can be monitored in a reflective mode, by a beam of polarized spectroscopic electromagnetic radiation provided by said spectroscopic ellipsometer system, said spectroscopic ellipsometer system being oriented so as to direct a beam of polarized spectroscopic electromagnetic radiation onto said substrate surface at an oblique angle;
   c'. applying said essentially monochromatic transmission system to said system for fabricating Narrow Bandpass Optical Filters such that a substrate can be monitored in a transmissive mode by a beam of electromagnetic radiation which is provided by said essentially monochromatic central passband wavelength source of electromagnetic radiation, said essentially monochromatic transmission monitoring system being oriented to direct a beam of essentially monochromatic radiation substantially along a normal to the surface of the substrate;
   d. placing a substrate into said system for fabricating Narrow Bandpass Optical Filters;
   e. determining a wavelength range around a central band pass wavelength of the Narrow Bandpass Optical Filter in which reflectivity thereof to a beam of electromagnetic radiation impinged at an oblique angle to a surface thereof is expected to be essentially 100%;
   f. while depositing a plurality of alternating High and Low Refractive Index layers onto said substrate, determining both transmission data in the central passband wavelengths, and Ellipsometric DELTA in the range of wavelengths identified in step e.;
   g. utilizing the resulting Transmission and Ellipsometric DELTA data to monitor and/or control the fabrication process.

10. A method of monitoring and/or controlling fabrication of Narrow Bandpass Optical Filters as in claim 9, in which the range of wavelengths over which ellipsometric DELTA is determined includes excluding the central passband wavelengths.

11. A method of monitoring and/or controlling fabrication of Narrow Bandpass Optical Filters as in claim 9, in which determined transmission data comprises a sequence of extrema turning points in a plot of transmission intensity vs. layer number, and in which said extrema turning points are used to determine when to change from depositing high to low and low to high refractive index materials when depositing quarter-wavelength optical thickness layers; and wherein determined ellipsometric DELTA data comprises a sequence of DELTA values vs. wavelength and is used to determine when to change from depositing high to low and low to high refractive index materials when depositing other than quarter-wavelength optical thickness layers.

12. A method of monitoring and/or controlling fabrication of Narrow Bandpass Optical Filters as in claim 9, in which the spectroscopic ellipsometer system comprises:

a spectroscopic rotating compensator sample system investigation system comprising a source (LS) of a polychromatic beam of electromagnetic radiation (PPCLB), a polarizer (P), a stage (STG) for supporting a sample system, an analyzer (A), a dispersive optics (DO) and at least one detector system (DET) which contains a multiplicity of detector elements (DE's), said spectroscopic rotating compensator sample system investigation system further comprising at least one compensator(s) (C) (C') (C") positioned at a location selected from the group consisting of: (before said stage (STG) for supporting a sample system (SS), and after said stage (STG) for supporting a sample system (SS), and both before and after said stage (STG) for supporting a sample system (SS)); such that when said spectroscopic rotating compensator sample system investigation system is used to investigate a sample system (SS) present on said stage (STG) for supporting a sample system, said analyzer (A) and polarizer (P) are maintained essentially fixed in position and at least one of said at least one compensator(s) (C) (C') (C") is caused to continuously rotate while a polychromatic beam of electromagnetic radiation (PPCLB) produced by said source (LS) of a polychromatic beam of electromagnetic radiation (PPCLB) is caused to pass through said polarizer (P) and said compensator(s) (C) (C') (C"), said polychromatic beam of electromagnetic radiation being also caused to interact with said sample system (SS), pass through said analyzer (A) and interact with said dispersive optics (DO) such that a multiplicity of essentially single wavelengths are caused to simultaneously enter a corresponding multiplicity of detector elements (DE's) in said at least one detector system (DET).

13. A method of monitoring and/or controlling fabrication of Narrow Bandpass Optical Filters which transmit a central passband of wavelengths while rejecting wavelengths outside thereof, comprising the steps of:

a. providing a system for fabricating Narrow Bandpass Optical Filters which comprises means for depositing alternating layers of High and Low refractive Index materials onto a substrate; and b. providing a spectroscopic ellipsometer system and a source of an essentially monochromatic central passband wavelength;

c. applying said spectroscopic ellipsometer system to said system for fabricating Narrow Bandpass Optical Filters such that a substrate can be monitored in a reflective mode, by a beam of polarized spectroscopic electromagnetic radiation provided by said spectroscopic ellipsometer system, said spectroscopic ellipsometer system being oriented so as to direct a beam of polarized spectroscopic electromagnetic radiation upon said substrate surface at an oblique angle, and applying said source of an essentially monochromatic central passband wavelength so that said substrate can be monitored in a transmissive mode, said source of an essentially monochromatic central passband wavelength being oriented so as to direct a beam of essentially monochromatic radiation upon said substrate at a substantially normal angle;

d. placing a substrate into said system for fabricating Narrow Bandpass Optical Filters;

e. while depositing a plurality of alternating High and Low Refractive Index layers onto said substrate, in real-time determining the Ellipsometric DELTA and determining the effects of transmission through said substrate on said essentially monochromatic central passband wavelength;

f. utilizing the resulting Ellipsometric DELTA and transmission data to monitor and/or control the fabrication process.

14. A method of monitoring and/or controlling fabrication of Narrow Bandpass Optical Filters as in claim 13, which further comprises an initial step of determining a wavelength range, around the central bandpass wavelengths, in which reflectivity of the Narrow Bandpass Optical Filter being fabricated is expected to be essentially 100%, and during the step e. determination of Ellipsometric DELTA, limiting determination of the ellipsometric DELTA using only that range of wavelengths.

15. A method of monitoring and/or controlling fabrication of Narrow Bandpass Optical Filters as in claim 14, which includes excluding the central passband wavelengths.

16. A method of monitoring and/or controlling fabrication of Narrow Bandpass Optical Filters as in claim 13, in which the spectroscopic ellipsometer system comprises:

a spectroscopic rotating compensator sample system (SS) investigation system comprising a source (LS) of a polychromatic beam of electromagnetic radiation (PPCLB), a polarizer (P), a stage (STG) for supporting a sample system, an analyzer (A), a dispersive optics (DO) and at least one detector system (DET) which contains a multiplicity of detector elements (DE's), said spectroscopic rotating compensator sample system investigation system further comprising at least one compensator(s) (C) (C') (C") positioned at a location selected from the group consisting of: (before said stage (STG) for supporting a sample system (SS), and after said stage (STG) for supporting a sample system (SS), and both before and after said stage (STG) for supporting a sample system (SS)); such that when said spectroscopic rotating compensator sample system investigation system is used to investigate a sample system (SS) present on said stage (STG) for supporting a sample system, said analyzer (A) and polarizer (P) are maintained essentially fixed in position and at least one of said at least one compensator(s) (C) (C') (C") is caused to continuously rotate while a polychromatic beam of electromagnetic radiation (PPCLB) produced by said source (LS) of a polychromatic beam of electromagnetic radiation (PPCLB) is caused to pass through said polarizer (P) and said compensator(s) (C) (C') (C"), said polychromatic beam of electromagnetic radiation being also caused to interact with said sample system (SS), pass through said analyzer (A) and interact with said dispersive optics (DO) such that a multiplicity of essentially single wavelengths are caused to simultaneously enter a corresponding multiplicity of detector elements (DE's) in said at least one detector system (DET).

17. A method of monitoring and/or controlling fabrication of Narrow Bandpass Optical Filters as in claim 1 which further comprises an initial step of determining a wavelength range, around the central bandpass wavelengths, in which reflectivity of the Narrow Bandpass Optical Filter being fabricated is expected to be essentially 100%, and during the step e. determination of Ellipsometric DELTA, limiting determination of the ellipsometric DELTA using only that range of wavelengths, and in which the steps:
   e. while depositing a plurality of alternating High and Low Refractive Index layers onto said substrate, in real-time determining the Ellipsometric DELTA; and
   f. utilizing the resulting Ellipsometric DELTA data to monitor and/or control the fabrication process;
involve determining and utilizing changes in DELTA over said range of wavelengths around the central bandpass wavelengths and monitoring a change in the locus of said plots during deposition of alternating High and Low Refractive Index layers onto said substrate.

18. A method of monitoring and/or controlling fabrication of Narrow Bandpass Optical Filters as in claim 6 in which the steps:
   f. while depositing a plurality of alternating High and Low Refractive Index layers onto said substrate, determining the Ellipsometric DELTA in the range of wavelengths identified in step e.;
   g. utilizing the resulting Ellipsometric DELTA data to monitor and/or control the fabrication process.
involve determining and utilizing changes in DELTA over said range of wavelengths around the central bandpass wavelengths and monitoring a change in the locus of said plots during deposition of alternating High and Low Refractive Index layers onto said substrate.

19. A method of monitoring and/or controlling fabrication of Narrow Bandpass Optical Filters as in claim 9 in which the steps:
   f. while depositing a plurality of alternating High and Low Refractive Index layers onto said substrate, determining both transmission data in the central passband wavelengths, and Ellipsometric DELTA in the range of wavelengths identified in step e.;
   g. utilizing the resulting Transmission and Ellipsometric DELTA data to monitor and/or control the fabrication process. and/or control the fabrication process;
involve determining and utilizing changes in DELTA over said range of wavelengths around the central bandpass wavelengths and monitoring a change in the locus of said plots during deposition of alternating High and Low Refractive Index layers onto said substrate.

20. A method of monitoring and/or controlling fabrication of Narrow Bandpass Optical Filters as in claim 13, which further comprises an initial step of determining a wavelength range, around the central bandpass wavelengths, in which reflectivity of the Narrow Bandpass Optical Filter being fabricated is expected to be essentially 100%, and during the step e. determination of Ellipsometric DELTA, limiting determination of the ellipsometric DELTA using only that range of wavelengths, and in which the steps:
   e. while depositing a plurality of alternating High and Low Refractive Index layers onto said substrate, in real-time determining the Ellipsometric DELTA and determining the effects of transmission through said substrate on said essentially monochromatic central passband wavelength;
   f. utilizing the resulting Ellipsometric DELTA and transmission data to monitor and/or control the fabrication process;
involve determining and utilizing changes in DELTA over said range of wavelengths around the central bandpass wavelengths and monitoring a change in the locus of said plots during deposition of alternating High and Low Refractive Index layers onto said substrate.

* * * * *